United States Patent [19]

Metcalfe et al.

[11] 3,988,914
[45] Nov. 2, 1976

[54] ISOTHERMAL METAL FORMING APPARATUS

[75] Inventors: Arthur G. Metcalfe, San Diego; Fred K. Rose, Bonita, both of Calif.

[73] Assignee: International Harvester Company, San Diego, Calif.

[22] Filed: Aug. 26, 1975

[21] Appl. No.: 607,788

Related U.S. Application Data

[60] Division of Ser. No. 553,998, Feb. 28, 1975, which is a division of Ser. No. 484,307, June 28, 1974, Pat. No. 3,944,782, which is a continuation-in-part of Ser. No. 426,564, Dec. 20, 1973, abandoned, and Ser. Ser. No. 426,564, is a continuation of Ser. No. 226,570, Feb. 16, 1972, abandoned, said Ser. No. 227,683, and said Ser. No. 226,570 each is a division of Ser. No. 856,526, Sept. 8, 1969, Pat. No. 3,644,698.

[52] U.S. Cl. .................................... 72/69; 72/202; 72/342; 219/152
[51] Int. Cl.² .................. B21B 27/10; B21D 37/16; B21H 1/06
[58] Field of Search ............... 72/69, 200, 202, 250, 72/251, 342, 364; 219/83, 110, 117, 118, 149–154; 29/132

[56] References Cited

UNITED STATES PATENTS

| | | | |
|---|---|---|---|
| 939,167 | 11/1909 | Sack | 72/244 X |
| 1,347,917 | 7/1920 | Sheperdson | 72/234 X |
| 3,228,220 | 1/1966 | Schneckenburger | 72/250 X |
| 3,686,911 | 8/1972 | Plagemann et al. | 72/69 |

FOREIGN PATENTS OR APPLICATIONS

| | | | |
|---|---|---|---|
| 440,436 | 2/1927 | Germany | 72/202 |
| 14,069 | 8/1967 | Japan | 72/250 |
| 283,161 | 10/1970 | U.S.S.R. | 72/200 |

Primary Examiner—C.W. Lanham
Assistant Examiner—E. M. Combs
Attorney, Agent, or Firm—Strauch, Nolan, Neale, Nies & Kurz

[57] ABSTRACT

Metal forming apparatus in which a workpiece is heated and subjected to pressure, causing the metal to become plastic and flow into a selected configuration.

7 Claims, 7 Drawing Figures

ISOTHERMAL METAL FORMING APPARATUS

This application is a division of application Ser. No. 553,998 filed Feb. 28, 1975. The latter is a division of application Ser. No. 484,307 filed June 28, 1974, now U.S. Pat. No. 3,944,782 which is a continuation-in-part of applications Ser. Nos. 426,564 filed Dec. 20, 1973 (now abandoned), and 227,683 filed Feb. 18, 1972 (now U.S. Pat. No. 3,823,299). Application Ser. No. 426,564 is a continuation of application Ser. No. 226,570 filed Feb. 16, 1972 (now abandoned). Applications Ser. Nos. 227,683 and 226,570 are divisions of application Ser. No. 856,526 filed Sept. 8, 1969 (now U.S. Pat. No. 3,644,698).

The present invention relates to the shaping of metals and, more particularly, in one aspect to novel improved apparatus for forming metals which are difficult to process by conventional methods as well as those more readily formed metals. The term "metal", as used herein, includes both elemental methods and alloys unless indicated otherwise.

Numerous methods for the solid state forming of metallic workpieces into selected shapes have heretofore been proposed. These include: rolling, forging, certain types of welding, piercing, drawing or cupping, spinning, and extrusion.

Of the foregoing, various forging techniques in which the metal is worked at an elevated temperature are widely used with roll forging playing a prominent role because the shaping proceeds in a continuous fashion. Roll forging can accordingly be employed to impart selected shapes to workpieces of indefinite length In the typical forging operation, the workpiece is preheated to forging temperature and then shaped with a hammer, press, or rolls. This process is useful for forming weak and ductile materials such as steel but becomes less and less useful as the strength and/or the brittleness of the workpiece metal increases.

First, preheating as heretofore carried out causes oxidation, scaling, or sub-surface contamination or a combination of these effects. All are undesirable. They can reduce the ability of the workpiece to undergo deformation and, at the very least, result in parts that are rough and/or scaled to the extent that overall machining may be required to produce an acceptable finish.

Another disadvantage of conventional forging processes as far as the forming of other than ductile metals is concerned is that the workpiece cools while it is transferred from the preheating furnace to the forging machine. The cooling or chilling of the workpiece accelerates when it contacts the dies, rolls, and other forming tools of the forging machine. Typically, the total cooling of the workpiece will be so extensive that the temperature at which the workpiece is actually formed will be as much as 500° F. below the temperature at which the workpiece leaves the preheating furnace.

This cooling of the workpiece may reduce its plasticity to the point where the workpiece cannot be formed without cracking or similar deterioration. And, even if this does not occur, the pressures required to deform the workpiece can become so high that cracking of or other damage to the tools and/or other components of the forging machine becomes likely. Also, even with high pressures, the amount of deformation that can be produced is so small that the process becomes economically unattractive at best.

Another hot forging process heretofore proposed is electrical resistance hot upsetting with conventional unheated forging rolls. This process, disclosed in U.S. Pat. No. 2,813,194 issued Nov. 12, 1957, to R. B. Stermon for UPSETTING MACHINE, is expressly characterized as being useful for forming "ductile material".

The art recognizes that the Stermon process is not useful for forming harder, more difficult-to-work materials. In U.S. Pat. No. 2,922,014 issued Jan. 19, 1960, to V. W. Green for HIGH FREQUENCY INDUCTION HEATING AND ROLL FORGING OF METAL WORKPIECES, the patentee discusses several disadvantages of the Stermon process and points out that it is not of value where hard-to-work metals are involved.

The reasons that the Stermom process cannot be used to form hard-to-work metals are manifest from an inspection of the forging apparatus disclosed in his patent. Heat is extracted from the workpiece by the forging rolls, reducing its temperature; and the workpiece becomes too hard to be shaped.

The Stermon process is also unusable to shape hard metals and alloys because, as the edge of the workpiece is upset, the metal flows into contact with upset limiting blocks and because the rest of the workpiece is unheated and, also, in thermal contact through electrical conductors with massive, unheated die blocks (materials having low ohmic resistance are good thermal conductors). The die blocks, conductors, and upset limiting blocks would chill the edges of a hard, non-ductile metal workpiece to such an extent that it could not be satisfactorily shaped, even if it were not chilled to an unacceptable extent by the forming rolls.

The development of harder and higher strength materials since Stermon's day has been paralleled by a search for techniques which can be used to form them. One technique is proposed in the Green patent identified above, a more recent one in U.S. Pat. No. 3,250,104 issued May 10, 1966, to Fischer for High-Temperature Rolling Mill.

Fischer's process involves preheating the workpiece to forming temperature and then shaping it with rolls heated by gas-fired or electric heaters adjacent the rolls. The rolls are covered with a carbide, boride, or oxide to make them heat resistant.

The Fischer process is not without its drawbacks. Preheating, as carried out by Fischer, produces surface contamination. This rules out the process for applications where thin gauge metals or thin sections are involved.

Also, the long time at high temperature which Fischer's preheating entails causes gain growth and/or other changes in the microstructure of the workpiece material. Such changes are undesirable because they weaken or otherwise adversely effect the physical properties of the material.

In addition, preheating as described in Fischer involves workpiece contact with an oxidizing environment while the workpiece is at an elevated temperature. This decreases the ductility of many metals by general subsurface contamination or by grain boundary oxidation. Metals in the first category include titanium, zirconium, columbium, and others. In the second category are nickel-based alloys such as Rene' 95 and other materials.

The search for better techniques of forming harder metallic materials has accordingly continued, culminating in the novel process disclosed in parent application No. 553,998. In that process the workpiece is formed with a relatively small, forming roll. Electrical current is passed from the forming roll or tool through the workpiece to the workpiece support. This results in that peripheral region of the forming roll in contact with the workpiece tending to reach the same incandescent temperatures as the workpiece. Accordingly, an isothermal condition between the electrode and the workpiece is approached; and the workpiece remains hot until the forming is completed rather than being chilled as it is by the forming tools in conventional processes. While the forming tool does not reach precisely the same temperature as the workpiece, the temperature difference is small enough that heat does not flow into the forming tool at a high enough rate to significantly reduce the temperature of the workpiece, let alone chill it.

Numerous advantages of forming metal by this novel technique are described in detail in parent application Ser. No. 553,998 to which the reader is referred.

Preheating of the workpiece can in some instances be used to advantage. For example, this technique can be used to reduce the force required for deformation of the workpiece. Preheating of the forming tool ahead of the point of contact with the workpiece may also sometimes be employed to advantage in conjunction with preheating of the workpiece.

Because the workpiece is cold if preheating is not employed, maximum pressure may be exerted on the workpiece upon first contact by the forming roll, this pressure decreasing as the temperature increases and the workpiece becomes more plastic. Because of this relation of the highest pressure area to workpiece plasticity, the force promoting rejection of the part can become high enough to necessitate force feed, a technique which is often advantageous and in other cases eliminated with advantage by using preheating.

Another reason for employing preheat is that, in certain instances, some deformation of the workpiece occurs as much as one inch ahead of the location where the forming tool and the workpiece make contact. Preheat can reduce the resistance to deformation in this area and, also, minimize the temperature gradient in the workpiece, preventing cracking in the workpiece area ahead of the forming roll.

In a typical application in which preheating is employed, the temperature of the workpiece will be increased from room temperature to 1200° F. over a period of 60 seconds at which point it will be contacted by the forming tool, causing the workpiece temperature to increase an additional 600° F. in one second. The workpiece reaches a temperature as high as 1000° F. only in the final 10 seconds of the preheat period. Surface contamination under these conditions is insignificant.

It will be appreciated by the reader that preheating as just described is quite different from the technique previously described by that term as, in the latter, the workpiece is soaked in a furnace for an extended period of time with the undesirable results described above.

Another feature of apparatus in accord with the present invention that can often be used to advantage is force feeding of the workpiece past the forming tool. In numerous cases significantly increased per pass reductions in the thickness of the workpiece can be obtained by using force feed, and we have even succeeded is obtaining single pass reductions approaching 100 percent (knife edges) by employing this technique.

Force feeding can also be employed to minimize elongation of the workpiece in the forming process (undersirable in many instances) while promoting the desired lateral flow of the workpiece metal.

One primary object of the present invention resides in the provision of novel, improved apparatus for forming metallic workpieces into components of selected configuration.

Other important but more specific objects of the invention reside in the provision of apparatus in accord with the preceding object:

1. which can be employed to efficiently and effectively carry out the several novel metal forming processes described above and in more detail in parent application No. 553,998;

2. in which, in conjunction with the proceding object, that portion of the forming tool in contact with the workpiece is heated to a temperature approaching the highest workpiece temperature by causing a flow of electrical current from the forming tool through the workpiece to a workpiece support;

3. in which provision is made for applying force feed to the workpiece being formed;

4. which is capable of preheating the workpiece to a selected temperature in applications where preheat can be used to advantage;

5. which has various combinations of the desirable attributes listed in the preceding objects.

Further important objects and advantges and additional novel features of our invention will become apparent from the appended claims and as the ensuing detailed description and discussion proceeds in conjunction with the accompanying drawing, in which:

Figure 1:
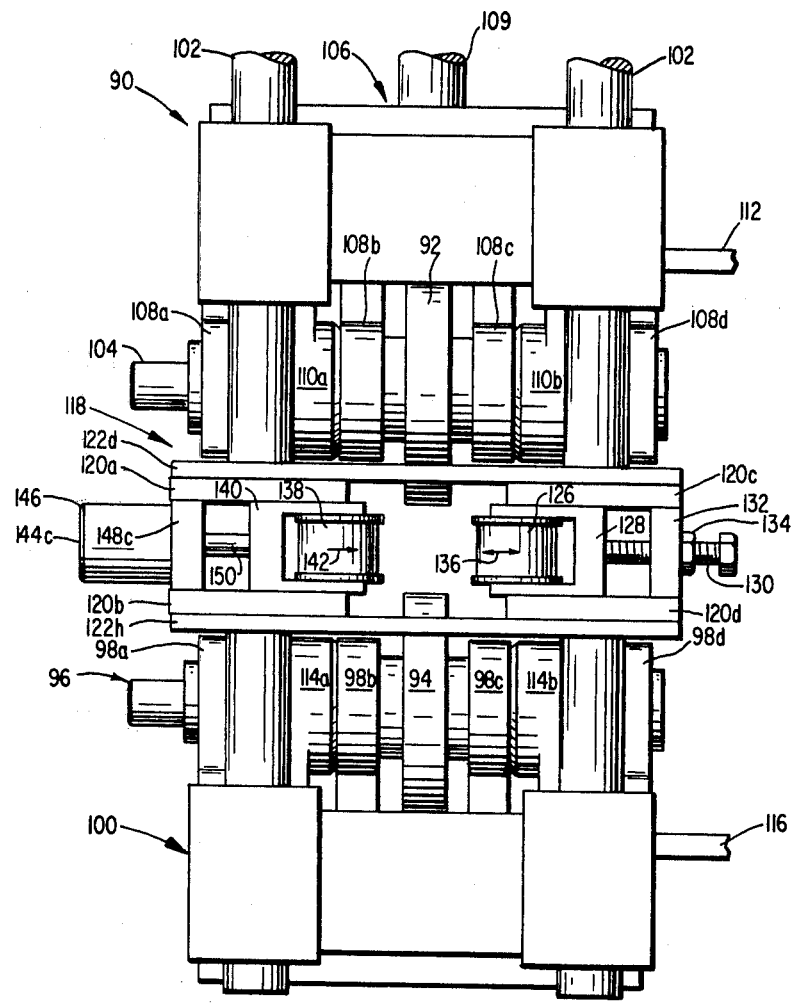
FIG. 1 is a front view of metal forming apparatus constructed in accord with and embodying the principles of the present invention.
Figure 2:
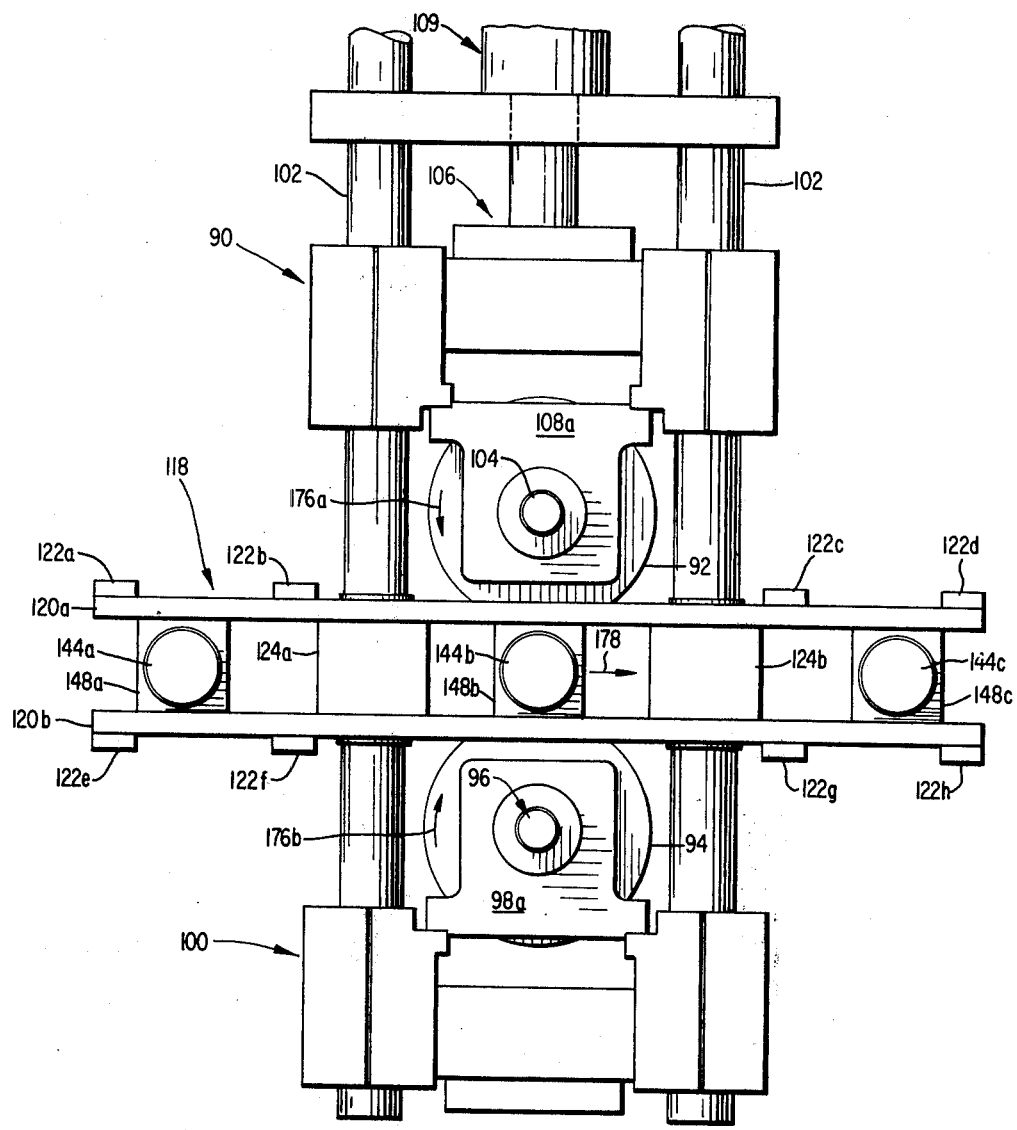
FIG. 2 is a side view of the apparatus of FIG. 1.

Referring now to the drawing, FIGS. 1 and 2 show, diagrammatically, one form of apparatus 90 in which metallic workpieces may be formed into components of selected configuration in accord with the principles of the present invention. In apparatus 90, the forming is accomplished by effecting movement of the workpiece between and relative to upper and lower forming tools 92 and 94. The forming tools also serve as electrodes between which electrical current can flow through the workpiece.

The forming tools are fabricated from a refractory metal so that they will retain their strength at the temperatures necessary to form hard metals. Molybdenum is satisfactory as are its alloys such as TZM and TZC. Tungsten, tantalum, and columbium and their alloys and other refractory metals and refractory alloys may also be employed with the choice being dictated by the requirements of a particular application, the costs of manufacturing the forming tool from different candidate materials, the service life of particular materials, etc.

Workpiece temperatures of 2500° F. are readily reachable; and even higher forming temperatures can be employed, if desired. Molybdenum alloy forming tools are capable of being used at temperatures as high as 2500° F.; and tools of tungsten and its alloys, for example, can be used at still higher temperatures.

The lower forming tool 94 is mounted on a lower drive shaft 96 supported in bearings (not shown) disposed in four bearing housings 98 $a$–$d$. The bearing housings are, in turn, supported from a lower head 100 clamped to four vertically extending structural columns 102 (only two of which are shown in FIGS. 1 and 2).

The upper forming tool 92 is similarly mounted on an upper drive shaft 104 rotatably supported from an upper head 106 by bearings (not shown) disposed in bearing housings 108 $a$–$d$. The upper head 106 is slidably mounted for movement in a vertical direction on structural columns 102.

In the forming operation, a force of predetermined magnitude is exerted on the workpiece being formed by biasing upper head 106 and, therefore, the upper forming tool toward the lower forming tool 94. The force is exerted by a hydraulic ram 109 which, in the illustrated machine, has a nominal 25,000 pound capacity.

The upper forming tool/electrode 92 is connected to one side of an electrical power source through rotary current collectors 110$a$ and 110$b$ and a bus bar 112. The lower forming tool/electrode 94 is connected to the opposite side of the power source through current collectors 114$a$ and 114$b$ and bus bar 116. The circuit is completed through the workpiece as discussed above.

The dimensions of the rotatable electrodes will of course depend upon the configuration and dimension of the workpiece and the configuration into which it is to be formed as well as the physical capabilities of the other machine components. In the machine shown in FIGS. 1 and 2, the electrode/forming tools are two inches wide and twelve inches in diameter. They are fabricated from TZM molybdenum alloy.

The workpiece to be formed and associated tooling for supporting it during the forming operation (if employed) are guided between the upper and lower electrodes 92 and 94 by a workpiece guidance system 118. This system consists of upper and lower longitudial rails 120 $a$–$d$ connected into an integral structure by tie bars 122 $a$–$h$ and four sleeve bushings (only two which, 124$a$ and 124$b$, are shown). The workpiece guidance system is supported for vertical sliding movement on the structural columns 102 of the machine, the later extending through the bushings of the guidance system.

Rotatably mounted between the upper and lower longitudinal rails 120$c$ and 120$d$ of the workpiece guidance system in longitudinally spaced relationship is a set of rear clamp rolls 126 (only one of which is shown). In the illustrated machine, three rear clamp rolls are employed.

Each of the three clamp rolls 126 is supported for rotary movement about a vertical axis in a support 128. The supports are slidably mounted between upper and lower rails 120$c$ and 120$d$ of the guidance system so that they can be moved toward and away from forming tools 92 and 94 to accommodate different workpieces and tooling.

Adjustment of each rear clamp rool is effected by a threaded member 130 fixed to the associated clamp roll support. The threaded member protrudes through a stiffener block 132 between rails 120$c$ and 120$d$ and is threaded through an internally threaded member 134 fixed to the outer side of the stiffener block. By rotating the adjusting member 130, it can be caused to move longitudinally in member 134, displacing the associated slide and rear clamp roll toward and away from forming tools 92 and 94 as shown by the double-headed arrow 136 in FIG. 1 to align the rear clamp rolls relative to each other and the forming tools.

Cooperating with the rear clamp rolls just described to guide the workpiece through machine 90 are three front clamp rolls 138 (only one of which is shown) each located opposite one of the rear clamp rolls. The front clamp rolls are supported for rotation about vertical axes from supports 140 slidably disposed between guidance system upper and lower front rails 120$a$ and 120$b$.

In operation, hydraulic rams 144 $a$–$c$ bias the front clamp rolls toward the rear clamp rolls as shown by arrow 142 in FIG. 1 to confine the tooling and workpiece to a rectilinear path through the forming rolls. The barrel 146 of each ram is fixed to an associated support and stiffener block 148 $a$–$c$ mounted between upper and lower front rails 120$a$ and 120$b$ of the workpiece guidance system. The actuator 150 of the ram extends through the block 148 and has its free end fixed to the associated clamp roll support 140.

As in the case of the parameters discussed above, the clamping forces to be exerted by hydraulic rams 144 $a$–$c$ will be dictated by the requirements of the particular application of the invention. In general, however, we have found that clamping forces equal to the force exerted by the upper forming tool 92 on the workpiece will be sufficient to guide the workpiece through the machine and to keep the tooling members between which the workpiece may be confined from spreading.

The workpiece guidance system is clamped to the vertical structural columns 102 of machine 90 to position the lower forming roll 94 at the appropriate level in those applications of the invention involving forming only by the upper forming roll. The lower forming roll acts as a support for the workpiece and any associated tooling.

In those operations involving forming by both forming rolls such as the simultaneous spreading of upper and lower I-beam flanges, the guidance system will be left to float in a vertical direction. Preferably, the system will be counterbalanced so that it will move freely in the latter mode of operation.

If linear tooling is employed, the material from which it is fabricated will depend upon the particular application of our invention. We have successfully employed 1020 mild steel and, in the more demanding applications, the same material hard faced on its workpiece contacting surfaces with Stellite No. 6 alloy and with Stoody No. 6 hard facing arc rod. For applications involving still more stress on the tooling, we have found molybdenum and its alloys such as TZM satisfactory. The tooling can also be made of other refractory metals in demanding applications of the invention.

Mild steel tooling with molybdenum or molybdenum alloy inserts can also be employed, and chrome plating having a thickness of 0.001 inch or less can be employed to upgrade the performance of steel tooling.

Insulating members can be fixed to the tooling to eliminate flow of current between the forming tools or rolls and the tooling, confining the flow of current to the region of the workpiece in which the forming occurs.

There are various types of insulation which may be employed for the purposes just discussed. One which has been found satisfactory is fiberglass tape.

A lubricant will typically be employed to eliminate sticking between the workpiece, forming tool, and guide rolls or linear tooling. The lubricant will also typically promote the desired lateral flow of the workpiece metal and minimize unwanted elongation of the workpiece.

One suitable lubricant is flake graphite. Other lubricants can be used instead although conventional hot die, rolling mill, and other lubricants are not satisfactory because, in our process, it is essential that the lubricant not alter the path of or otherwise interfere with the electrical current flow.

Also, the lubricant must be free of a tendency to stick to the forming tool or to deteriorate the workpiece, easily removable from the workpiece, economical and easy to apply by non-skilled personnel, and otherwise generally satisfactory for shop use.

Another lubricant which has the characteristics necessary for our process is finely divided tungsten powder (ca. 1 micron particle size is satisfactory) dispersed in a plastic binder.

This type of lubricant is particularly useful in forming steels and iron and cobalt or nickel based superalloys because graphite has the potential for causing such materials to melt.

Flake silver is also a good lubricant for those applications where graphite cannot be used.

An inert atmosphere is not necessarily required to protect the workpiece against deterioration because of the short periods for which the workpiece metal is at an elevated temperature. It may, however, be beneficial to purge the area in which the forming takes place with an inert gas such as argon to prevent loss of the lubricant by oxidative deterioration.

Figure 3:
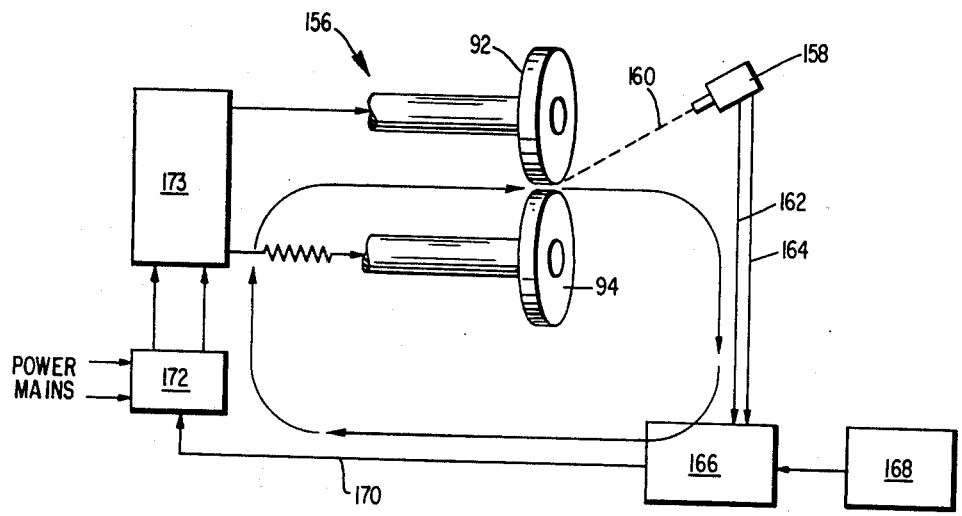
FIG. 3 is a schematic illustration of one form of control system which can be employed to control process conditions in apparatus of the character illustrated in FIGS. 1 and 2.

A further, and most important, aspect of the apparatus employed in carrying out the process disclosed herein is a system for controlling the density of the current flowing from forming tool 92 to forming tool 94 through the workpiece being formed. One control system 156, which can be employed in a machine of the character illustrated in FIGS. 1 and 2, is illustrated in FIG. 3.

The illustrated control system is of the highly preferred feedback type. A detector 158 generates an electrical output signal indicative of the actual forming conditions. A comparison is made between the actual conditions as ascertained by the detector and the established conditions. If there is a deviation, an error signal is generated and employed to adjust the density of the current through the workpiece in the direction necessary to bring the forming conditions to the established level.

In the illustrated system the feedback signal generating detector is a radiation pyrometer sighted on the portion of the workpiece being formed as indicated by line 160. The pyrometer will preferably be one having a small target area such as an Ircon Model 300. Use of a pyrometer of this character avoids the necessity of employing elaborate networks to remove unwanted electrical signal components.

The output signal from the pyrometer is conducted by inputs 162 and 164 to a process controller 166 where the signal is compared with a setpoint reading to identify deviations from the desired forming temperature. One suitable process controller for use with machines of the character shown in FIGS. 1 and 2 is the Research, Inc. "Thermac Model PC 5192". The setpoint is obtained manually or by a programmer 168 which may be, for example, Research, Inc. "Data-Trak Model 411.01".

The process controller 166 is connected through output 170 to an SCR power controller 172 such as a Loyola LPAC-3-480-207. The power controller regulates the level at which the current flows to the workpiece from a conventional power supply 173. The power supply is connected to an AC power source and to the forming tools 92 and 94 in the manner described above.

The primary function of the control system is to so regulate the density of current flowing through the workpiece as to maintain the workpice temperature substantially constant or to vary it in a predetermined pattern. Because of the importance of maintaining the temperature precisely at the desired level, the novel, closed loop type of control system just described is preferred.

It is not essential that the detector be a radiation pyrometer. Other detectors or sensing devices which can be employed instead of the latter are illustrated and described in progenitive U.S. Pat. No. 3,644,698.

Control over the force exerted by the forming rolls is also important in ensuring satisfactory results; and machine 90 will, therefore, preferably be provided with a system for controlling this workpiece forming parameter. This control system has not been shown because the details of the system are not considered essential to an understanding of the present invention or to its practice.

Briefly, however, this system will preferably be of the closed loop, feedback type like the temperature control system. It will typically consist of one or more load cells so located as to respond to the force exerted on the workpiece and feedback circuits from the load cell to an appropriate process controller for hydraulic ram 109.

In some applications of the invention, feeding of the workpiece through the machine will be accomplished by rotating the upper and lower forming rolls in the directions shown by arrows 176a and 176b in FIG. 2 to displace the workpiece in the direction shown by arrow 178.

In other applications, the forming rolls will be left to freewheel; and the workpiece will be pulled through the machine as with a hydraulic ram (not shown) to apply front tension to the workpiece.

In still other applications, compressive (or force) feeding of the workpiece will be utilized to produce lateral flow of the workpiece by exerting on the unformed part of the workpiece a force acting in the direction of movement of the workpiece toward the forming rolls. This force feed also eliminates the slippage between the workpiece and the forming rolls which can occur at higher reductions (typically 50 percent or greater) and also in multistand operations to compensate for such elongation of the workpiece as may occur prior to a given forming stage. Because the workpiece is unheated until it reaches the forming roll, very high compressive feed forces can be applied.

In conjunction with the foregoing, force feeding of the workpiece between the forming rolls with the rolls freewheeling can be employed to obtain reductions up to nearly 100 percent. The process at this point becomes similar to extrusion, the rotatable forming rolls resembling extrusion dies with surfaces renewable as the rolls rotate.

And, in still other applications, combinations of feed techniques may be employed. For example, compressive feeding will often be used in combination with front tension, which may be applied with a hydraulic appliance, the forming rolls typically being left to free wheel in this case. The combination of compressive or force feeding and front tension promotes lateral spreading of the workpiece metal and minimizes bowing and other departures of the workpiece from straightness in the forming operation.

In those applications requiring driving of the upper and/or lower forming rolls, the mechanism for driving them (not shown) may be of the character described in U.S. Pat. No. 3,644,698.

FIG. 4 shows, again diagrammatically, a machine 182 which differs from the machine 90 described previously in that it is equipped for force or compressive feeding of the workpiece. In this machine upper and lower feed rolls 184 and 186 feed the workpiece 188 between upper and lower forming rolls 190 and 192.

The feed rolls are mounted on transversely extending drive shafts 194 and 196. The drive shafts can be rotated by any system capable of exerting the requisite force and of driving the rolls at the requisite speed with a high degree of accuracy. Many motor speed controlling systems capable of operating with a high degree of accuracy, such as the SCR type developed by General Electric Company, are available. It is accordingly not deemed necessary to describe or illustrate the motor and its control system herein.

The faces of feed rolls 184 and 186 may be serrated to improve the grip on the workpiece 188. Any indentations, etc. imparted to the workpiece by the serrations will be eliminated in the subsequent forming operation.

As discussed briefly above, moderate preheat can in some cases be employed to advantage in forming metallic workpieces by the process disclosed herein. Provision for preheating the workpiece is also made in the machine shown in FIG. 4. Again, the heating is effected by completing an electrical circuit through the workpiece being formed.

In this case, the current is supplied from A.C. power supplies 198a and 198b through leads 200a and 200b to rotatable electrodes 202a and 202b located ahead of the forming rolls 190 and 192 in machine 182. The power supplies (which will typically be incorporated into a single unit in actual practice) are also connected through leads identified generally by reference characters 204a and 204b to the forming rolls.

Accordingly, one workpiece preheating circuit is completed from power supply 198a through lead 204a, upper forming roll 190, workpiece 188, electrode 202a, and lead 200a back to the power supply. A second preheating circuit is similarly completed through the workpiece from power supply 198b. Again, a feedback control system of the character described above (not shown) can be employed to ensure precise regulation of the temperature to which the workpiece is preheated.

Figure 4:
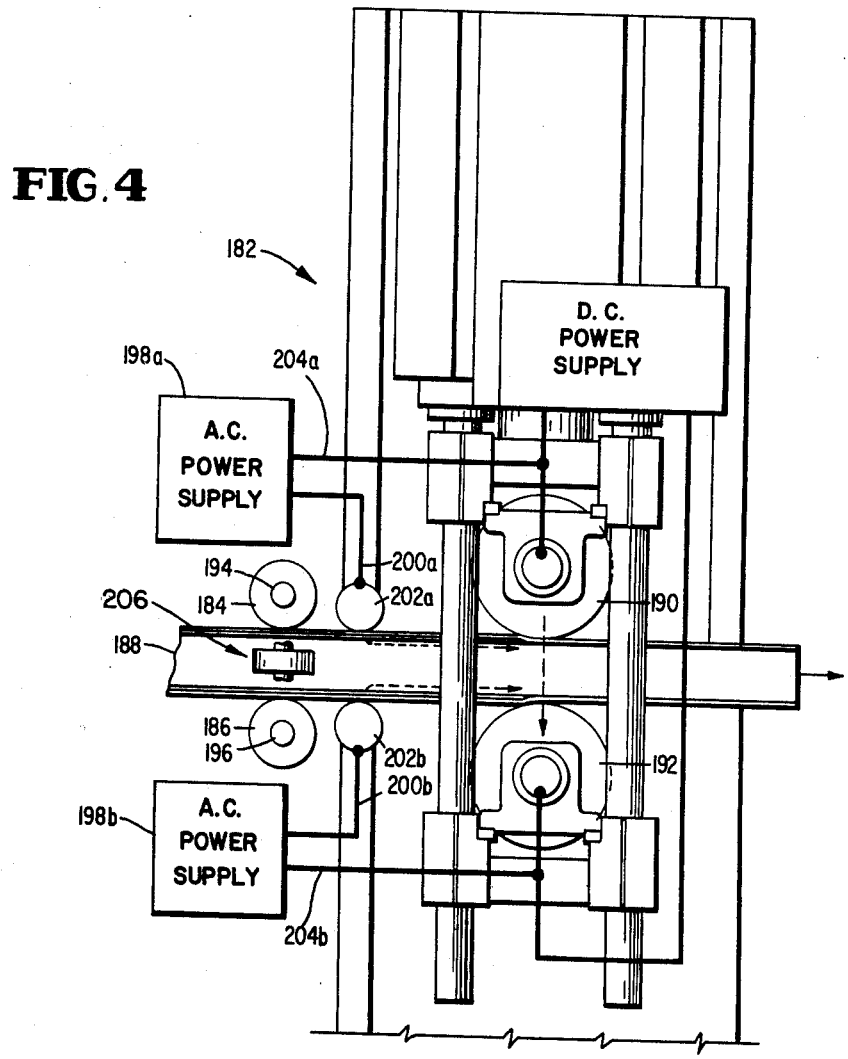
FIG. 4 is a side view of a second form of metal forming apparatus constructed in accord with and embodying the principles of the present invention.

Another advantage of our process suggested by the machine shown in FIG. 4 is that satisfactory results are not dependent upon the nature of the electrical current caused to flow through the workpiece. Alternating current, direct current, or a combination of both may be employed, the latter variation being shown in FIG. 4.

As indicated above, machine 182 may otherwise be essentially of the same character as the machine 90 shown in FIGS. 1 and 2. For example, it may be equipped with a workpiece guidance system of the type employed in machine 90. Such a system is shown in fragmentary form in FIG. 4 and identified by reference character 206.

A typical operation which may be carried out in apparatus as described above is the conversion of chemically milled blanks to T-sectioned members.

One set-up which can be employed for this purpose in apparatus a described above is shown in FIG. 5. It consists of a flat-faced forming roll 336 and forming rolls 338 and 340 mounted for rotation about a horizontal axis and separated by a shim 342 of the same width as the workpiece web. Rolls 338 and 340 guide the workpiece 344 through the machine and, also, form the under side of the cap and the fillets of the T-section.

Figure 5:
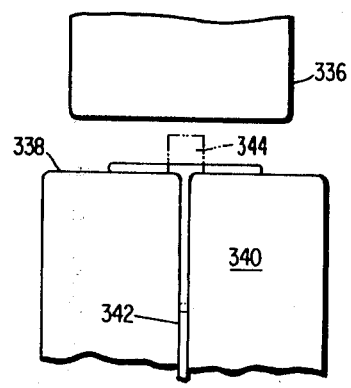
FIG. 5 shows, pictorially, a three roll set-up for spreading a thickened edge of a sheet or platelike workpiece of indefinite length into a flange with apparatus embodying the principles of and by employing force feeding in accord with the principles of the present invention.

Typically, force-feeding will be employed to minimize the elongation of the workpiece and promote lateral spreading when the flanges are formed as shown in FIG. 5.

The following set of forming parameters has been employed to form T-sections in one pass from Ti-6Al-4V in the set-up shown in FIG. 5:

| | |
|---|---|
| Squeeze force | 33,500 pounds |
| Feed force | 6,250 pounds |
| Amperage | 20,600 amps |
| Forming speed | 2 inches per minute |

The workpiece will typically reach a forming temperature between 1600° and 1700° F., and reductions on the order of 80 percent are typically achieved in one pass. A Ti-6Al-4V workpiece 0.260 inch wide and 0.385 inch thick has been spread to a cap 1.60 inches wide by 0.055 inch thick in one pass using the parameters listed above and the set-up of FIG. 5.

Figure 6:
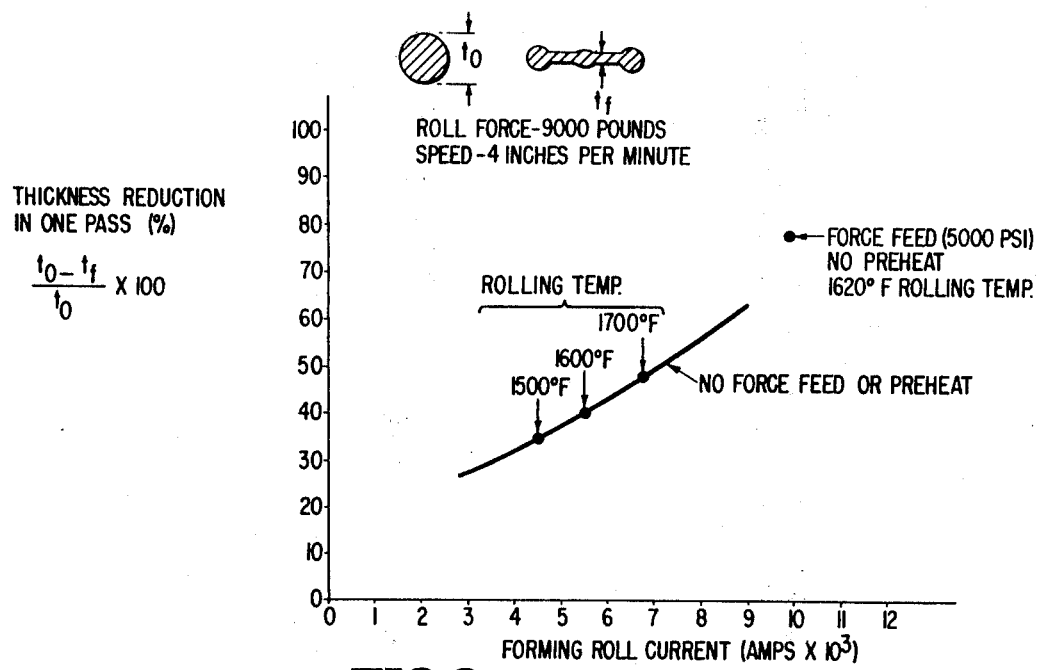
FIG. 6 shows, graphically, the effect of force feeding the workpiece past the forming tool.

Another exemplary application of the present invention in which force feed of the workpiece can be employed to advantage is the conversion of round barstock to a dumbbell shape. The beneficial effect of force feeding in this operation is a significant increase in per pass reduction of the workpiece as shown in FIG. 6.

The particular operation from which the data illustrated graphically in this figure were developed involved the forming of a 0.5 inch diameter A70 titanium bar. The rolling parameters are given in the drawing.

A 43 percent reduction in thickness was obtained at a rolling temperature of 1700° F. with no force feed. Even though the rolling temperature was reduced 80° F., the exertion of a 5,000 psi force feed resulted in the percentage of reduction being increased to 78 percent per pass.

Force feeding can also be employed to advantage in applications where the number of forming tools can be increased to reduce the number of operations needed to form a given shape or to form shapes which are more complicated than those which can be readily handled by two rolls.

Figure 7:
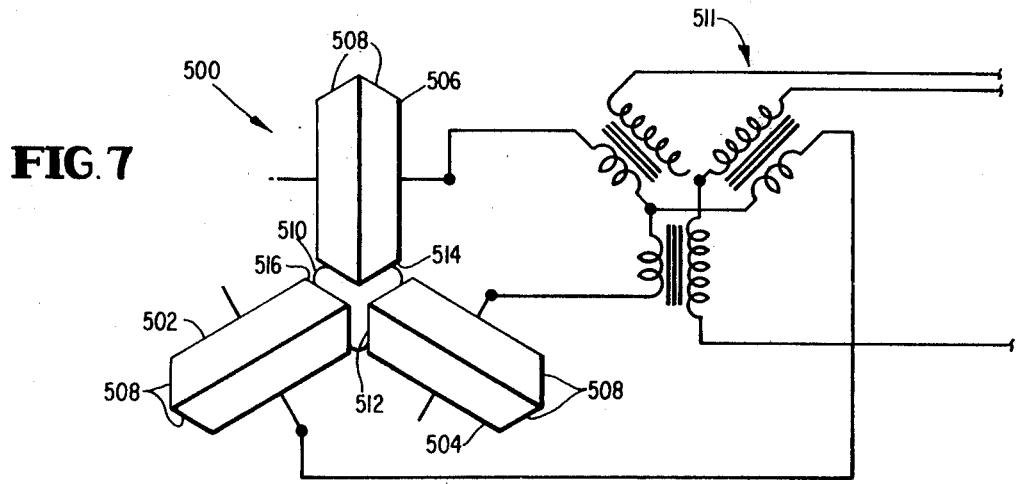
FIG. 7 shows, diagrammatically, apparatus for forming indefinite as opposed to discrete lengths of material to a selected configuration in accord with the principles of the present invention; in this case the apparatus is set up to convert round barstock to a Y-sectioned member.

Referring again to the drawing, FIG. 7 shows, diagrammatically, apparatus 500 for forming Y-sections by a technique in accord with our invention which employs more than two forming tools. The process is also of continuous character, illustrating the amenability to continuous operation of the apparatus disclosed herein.

Forming apparatus 500 includes three equidistinctly spaced refractory metal forming rolls 502, 504, and 506 with beveled faces 508. The rolls are rotatable about axes lying in the same plane and at angles of 120° to each other.

Hydraulic rams or the like (not shown) are employed to bias the forming rolls toward the line at which the apices of the beveled faces intersect and exert the requisite squeeze force on the workpiece 510.

As in the other machines discussed above, the forming rolls are also electrodes across which an electrical circuit can be completed to effect a flow of current through the workpiece and thereby heat it. In this case, each of the rolls is connected to one leg of a three-phase power supply 511 so that the current will flow simultaneously between each of the three forming roll pairs 502, 504; 502, 506; and 504, 506.

A feedback type control system (not shown, but preferably of the character described above) will typically be employed to precisely regulate the current flowing through the workpiece.

As the workpiece 510 moves through the forming rolls, it becomes plastic; and the metal spreads into the gaps 512, 514, and 516 between the forming rolls, converting the barstock to a Y-shape as shown in FIG. 7.

Force feeding of the workpiece will typically be employed because of the large amount of reduction and the large lateral displacements of the workpiece metal involved.

The various parameters involved in forming metal in our novel apparatus will vary from application-to-application. To illustrate the values which these parameters may assume, however, we have employed currents of 3,500–20,600 amperes at voltages ranging up to 15 volts, forming forces of 8,500–33,500 pounds for rotatable forming tools between one and two inches wide, compressive or force feed forces ranging up to 12,500 pounds, front tensions ranging up to 5,800 pounds, and forming speeds of 2–20 inches per minute.

Temperatures employed for forming components from sheet metal can typically be somewhat lower than those employed in forming barstock of the same material by the techniques which will be described next. We have successfully formed titanium alloy sheets (Ti-6Al-4V and Ti-6Al-6V-2Sn) to internal radii as small as one-fourth of the thickness of the sheet at temperatures as low as 1500°–1550° F., for example. In forming components from barstock of the same alloys forming temperatures as high as 2300° F. have been employed. This freedom in the selection of forming temperatures permits titanium alloys to be worked in the mixed alpha plus beta field, in the beta continuous field with dispersed undissolved alpha, or in the homogeneous beta field as desired to produce a component with optimal metallurgical and mechanical properties.

An ancillary step that can in some cases be employed to advantage in applications of the present invention involving the forming of components from sheet metal stock is preforming of the workpiece. Preforming reduces the number of passes through the forming machine required to shape the workpiece to its final configuration.

The preforming step will typically be carried out in a press brake or with cold rolls to displace adjacent sections of the sheet stock to an angular relationship with the radius of the juncture between the displaced sections several times the thickness of the sheet material. In the subsequent forming operation in accord with the principles of the present invention the workpiece is "ironed" onto the tooling to reduce the radius of the juncture and form the component to shape.

Among the extremely difficult-to-work and other metals that can be formed with the novel apparatus described herein are: 1018 mild steel, A70 titanium, beryllium, Ti-6Al-4V, Hastelloy X (Co 1.5, Cr 22, Mo 9.0, W 0.6, Fe 18.5, C 0.1, balance Ni), Inconel 713C (C 0.14, Cr 13.0, Mo 9.5, Ti 0.75, Al 6.0, Cb + Ta 2.3, balance Ni), Rene' 95 (Cr 14.0, Co 8.0, Mo 3.5, W 3.5, Cb 3.5, Ti 2.5, Al 3.5, balance Ni), Inconel 718 (C 0.04, Mn 0.20, Fe 18.0, Cr 14.0, Al 0.60, Ti 0.80, Cb 5.2, Mo 3.0, balance Ni) 17-4Ph (C 0.07, Cr, 16.5, Ni 4.0, Cu 4.0, Cb + Ta 0.30, balance Fe), Ti-6Al-6V-2Sn, and T321 and 18-8 stainless steels.

We have successfully demonstrated the applicability of apparatus as described above to the forming of T, Y, I, and E sections from barstock and milled blanks and Z and channel sections and flanged cylinders among others from sheet material. We have also successfully shown that our novel apparatus can be used for other forming operations such as straightening elongated structural shapes and shaping both the airfoil and root sections of turbine compressor blades.

Several of the shapes we have formed have been produced in a continuous manner rather than in discrete lengths.

Operations which have been carried out include, but are not limited to, square and other bending, spreading, upsetting, thinning, contour rolling, forward and backward extrusion, levelling and straightening.

As will be apparent to those skilled in the relevant arts from the foregoing text, there are innumerable applications and adaptations of the principles of our invention of which advantage can on occasion be taken. To the extent that these embodiments of our invention have not been expressly excluded from the appended claims, they are fully intended to be embraced therein.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed and desired to be secured by Letters Patent is:

1. Apparatus for the solid state forming of a metallic workpiece into a component of selected configuration, comprising: a rotatable, pressure applying electrode; means disposed in spaced relation to said electrode for supporting the workpiece; means supporting said electrode for movement toward and away from said workpiece supporting means; means operable to so bias said electrode toward said workpiece supporting means that it exerts a force of selected magnitude on said workpiece throughout the forming operation; means for heating both said workpiece in that region thereof between the pressure applying electrode and the workpiece supporting means and that portion of the electrode contiguous to the workpiece comprising means for connecting the workpiece across an electrical power source through the pressure applying electrode and the workpiece supporting means; means for so regulating the current density through the workpiece and the force exerted on it by the rotatable pressure applying electrode as to maintain the temperature of said workpiece below its melting point but sufficiently high to produce in the heated region between the pressure applying electrode and the workpiece supporting means a localized zone in which the workpiece is in a plastic and flowable condition; means for effecting a translation of the workpiece relative to the pressure applying electrode and the workpiece supporting means to thereby cause the zone in which the plastic condition exists to proceed along the workpiece; and means for preheating said workpiece prior to the engagement of the workpiece and the pressure applying electrode.

2. The apparatus of claim 1, in which the preheating means comprises means located adjacent said rotatable electrode and said workpiece supporting means for electrically heating said workpiece to a temperature below that in the localized zone in which the workpiece is in a plastic and flowable condition.

3. The apparatus of claim 1, wherein the means for preheating the workpiece comprises rotatable electrodes engageable with opposite sides of said workpiece and means for connecting said electrodes across an electrical power source through said workpiece.

4. The apparatus of claim 1, together with force feeding means for effecting a translation of the workpiece relative to the pressure applying electrode and the workpiece supporting means to thereby cause the zone in which the plastic condition exists to proceed along the workpiece and for exerting on said workpiece ahead of said pressure applying electrode a compressive force acting in the direction of workpiece movement to thereby increase the reduction of the workpiece that can be obtained and/or to promote the lateral flow of workpiece metal while inhibiting unwanted elongation of the workpiece.

5. Apparatus for the solid state forming of a metallic workpiece into a component of selected configuration, comprising: a rotatable, pressure applying electrode; means disposed in spaced relation to said electrode for supporting the workpiece; means supporting said electrode for movement toward and away from said workpiece supporting means; means operable to so bias said electrode toward said workpiece supporting means that it exerts a force of selected magnitude on said workpiece; means for heating both said workpiece in that region thereof between the pressure applying electrode and the workpiece supporting means and that portion of the electrode contiguous to the workpiece comprising means for connecting the workpiece across an electrical power source through the pressure applying electrode and the workpiece supporting means; means for so regulating the current density through the workpiece and the force exerted on it by the rotatable pressure applying electrode as to maintain the temperature of said workpiece below its melting point but sufficiently high to produce in the heated region between the pressure applying electrode and the workpiece supporting means a localized zone only in which the workpiece is in a plastic and flowable condition; and force feeding means for effecting a translation of the workpiece relative to the pressure applying electrode and the workpiece supporting means to thereby cause the zone in which the plastic condition exists to proceed along the workpiece and for exerting on said workpiece ahead of said pressure applying electrode a compressive force acting in the direction of workpiece movement to thereby increase the reduction of the workpiece that can be obtained and/or to promote the lateral flow of workpiece metal while inhibiting unwanted elongation of the workpiece.

6. The apparatus of claim 5, wherein the force feeding means comprises feed rolls drivingly engageable with said workpiece on opposite sides thereof.

7. The apparatus of claim 5, wherein said workpiece supporting means is a rotatably mounted electrode and wherein said electrodes and the pressure applying electrode are free-wheeling.

* * * * *